US00RE47692E

(19) United States
(12) Reissued Patent
Cho et al.

(10) Patent Number: US RE47,692 E
(45) Date of Reissued Patent: Nov. 5, 2019

(54) METHOD FOR CONTROLLING A WASHING MACHINE

(71) Applicant: LG ELECTRONICS INC., Seoul (KR)

(72) Inventors: Hung Myong Cho, Gimhae-si (KR); Byung Hwan Ahn, Gimhae-si (KR)

(73) Assignee: LG ELECTRONICS INC., Seoul (KR)

(21) Appl. No.: 14/990,312

(22) Filed: Jan. 7, 2016

Related U.S. Patent Documents

Reissue of:
(64) Patent No.: 8,621,695
Issued: Jan. 7, 2014
Appl. No.: 13/473,305
Filed: May 16, 2012

U.S. Applications:
(63) Continuation of application No. 11/629,134, filed as application No. PCT/KR2006/001182 on Mar. 31, 2006, now Pat. No. 8,181,299.

(30) Foreign Application Priority Data

May 31, 2005 (KR) ..... 10-2005-0046033
May 31, 2005 (KR) ..... 10-2005-0046034
(Continued)

(51) Int. Cl.
*D06F 35/00* (2006.01)
*D06F 33/02* (2006.01)
(Continued)

(52) U.S. Cl.
CPC ..... *D06F 35/006* (2013.01); *D06F 33/02* (2013.01); *D06F 39/008* (2013.01); *D06F 39/04* (2013.01);
(Continued)

(58) Field of Classification Search
USPC ..... 8/158, 159; 68/5, 5 R, 5 C, 15
See application file for complete search history.

(56) References Cited

U.S. PATENT DOCUMENTS 5,315,727 A * 5/1994 Lee ..... 8/159
6,125,490 A * 10/2000 Riechman ..... D06F 35/006 68/12.02
(Continued)

FOREIGN PATENT DOCUMENTS

CN 1580353 A 2/2005
EP 1275767 A1 1/2003
(Continued)

OTHER PUBLICATIONS

Machine English translation of JP 05-023493.*
Machine English translation of EP 1275767.*

*Primary Examiner* — Terrence R Till
(74) *Attorney, Agent, or Firm* — Dentons US LLP

(57) ABSTRACT

A washing machine is disclosed. A method for washing laundry with the washing machine enhances washing performance and enables sterilization of the laundry by using steam while preventing damage of cloth due to the steam. The method comprises primarily supplying water into a tub, and supplying steam by heating the water using a heater installed in the tub to generate the steam.

25 Claims, 9 Drawing Sheets

(30) Foreign Application Priority Data

May 31, 2005 (KR) ..... 10-2005-0046035
May 31, 2005 (KR) ..... 10-2005-0046036

(51) Int. Cl.
*D06F 39/08* (2006.01)
*D06F 39/00* (2006.01)
*D06F 39/04* (2006.01)

(52) U.S. Cl.
CPC ..... *D06F 39/088* (2013.01); *D06F 2202/04* (2013.01); *D06F 2202/085* (2013.01); *D06F 2204/04* (2013.01); *D06F 2204/084* (2013.01); *D06F 2204/086* (2013.01)

(56) References Cited

U.S. PATENT DOCUMENTS

2004/0154645 A1* 8/2004 Kim ..... 134/18
2004/0187527 A1* 9/2004 Kim et al. ..... 68/5 C
2004/0187529 A1* 9/2004 Kim et al. ..... 68/207
2004/0237603 A1* 12/2004 Kim et al. ..... 68/15
2004/0255391 A1 12/2004 Kim et al.
2005/0034250 A1* 2/2005 Oh et al. ..... 8/159
2005/0072022 A1 4/2005 Nagae et al.
2005/0092035 A1 5/2005 Shin et al.
2005/0144734 A1* 7/2005 Yang et al. ..... 8/149.3
2005/0144735 A1* 7/2005 Yang et al. ..... 8/149.3
2006/0000242 A1* 1/2006 Yang et al. ..... 68/5 R
2007/0107472 A1 5/2007 Kim et al.
2008/0028801 A1* 2/2008 Czyzewski et al. ..... 68/12.05
2013/0185873 A1* 7/2013 Bomar ..... D06F 39/008 8/137

FOREIGN PATENT DOCUMENTS

EP 1469120 A1 10/2004
EP 1507031 2/2005
JP 04-158896 A 10/1990
JP 05-023493 A 7/1991
KR 10-2004-00888848 A 10/2004
KR 10-2005-0047281 A 5/2005

* cited by examiner

METHOD FOR CONTROLLING A WASHING MACHINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application *is a reissue of U.S. patent application Ser. No. 13/473,305, filed on May 16, 2012, now U.S. Pat. No. 8,621,695 issued on Jan. 7, 2014, which* is a continuation of U.S. application Ser. No. 11/629,134, now U.S. Pat. No. 8,181,299, filed Dec. 11, 2006, which is a National Stage Entry of International Application No. PCT/KR2006/001182, filed on Mar. 31, 2006, and claims priority to Korean Patent Application Nos. 10-2005-0046033 filed May 31, 2005, 10-2005-0046034 filed May 31, 2005, 10-2005-0046035 filed May 31, 2005, and 10-2005-0046036 filed May 31, 2005, each of which is hereby incorporated by reference in its entirety as if fully set forth herein.

TECHNICAL FIELD

The present invention relates to a washing machine, and more particularly, to a method for washing laundry using steam, which can enhance washing performance, and enable sterilization of the laundry while preventing damage of the laundry due to the steam.

BACKGROUND ART

Generally, a washing machine can be classified into a pulsator type washing machine having a drum standing in a vertical direction, and a drum type washing machine having a drum lying in a horizontal direction.

Since the drum type washing machine lies in the horizontal direction, it performs washing operation in such a way of lifting and then dropping laundry within the drum.

FIGS. 1 and 2 schematically show a conventional drum type washing machine operated as mentioned above.

The drum type washing machine comprises a body 10, an outer tub 20 installed within the body 10, a drum 30 rotatably installed in the outer tub 20, a water supply pipe 50 to guide flow of water, and a driving unit to drive the drum 30.

Here, the body 10 is provided at a front side thereof with an input port 11 through which laundry is input to the body 10, and a door 40 attached to the input port 11 to open and close the input port 11.

The outer tub 20 has a damper 21, which is provided at either lower side around an outer periphery while being supported on an inner surface of the body 10.

The outer tub 20 is provided therein with a heater 80 on a bottom surface thereof to control the temperature of water used for washing the laundry.

The drum 30 is rotatably installed within the outer tub 20, and has a plurality of apertures 31 formed around an outer peripheral surface thereof such that water flows into and from the drum 30 therethrough.

The water supply pipe 50 is a passage through which the water for washing the laundry flows within the washing machine, and serves to guide the water supplied from a water pipe through a water supply valve 51 into the outer tub 20.

Meanwhile, the washing machine further comprises a detergent storage part 52 at the passage of the water supply pipe 50 to store detergent required for washing operation such that the detergent is added to the water supplied into the outer tub 20.

The detergent storage part 52 is provided in an upper space inside the body 10, and is adapted to allow input of detergent.

In addition, a distal end of the water supply pipe 50 is connected with an upper end of the outer tub 20 at a front side thereof such that water gradually fills up the outer tub 20 and the drum 30 from the bottom surface thereof after natural fall of the water.

The driving unit comprises a driving motor 71 to drive the drum 30, and a belt 72 connected between the driving motor 71 and the drum 30 to transmit driving force of the driving motor 71 to the drum 30.

However, the conventional drum type washing machine as described above provides simple functions of washing and drying the laundry, and does not provide other functions.

Furthermore, even for a small amount of laundry or laundry with small amount of contaminants, the conventional drum type washing machine requires not only a great amount of water, but also substantially the same period of time as that for a general washing operation, causing unnecessary consumption of electricity.

Recently, it is needed to provide a washing machine having an improved structure, which enables washing operation to be performed as efficiently as possible using as little water as possible.

Furthermore, although a controller of the washing machine serves to control the heater installed in the tub to warm the water, it does not serve to control the heater to generate steam. As a result, the conventional drum type washing machine cannot provide effect of washing the laundry with the steam. One of methods for enhancing washing effect is to increase the temperature of surroundings of the laundry. However, even with this method, it is insufficient to enhance the washing effect only with the water warmed in the tub.

DISCLOSURE OF INVENTION

An object of the present invention devised to solve the problem lies on a method for washing laundry, which generates steam using a heater installed in a tub, and supplies the steam to the laundry, thereby improving washing performance. For example, the steam increases the temperature of atmosphere in the drum or the tub, thereby enhancing washing effect. The increased temperature of the atmosphere prevents hot water from being rapidly cooled, thereby enhancing energy efficiency of the washing machine.

It is another object of the present invention to provide the method for washing laundry, which performs laundry soaking operation by circulating the water in the tub while increasing the temperature of the tub or the drum. Since a low temperature of the tub or the drum causes condensation of steam and results in dispersion thereof, it causes low energy efficiency of the washing machine. In this regard, circulation of the water helps increase the temperature around the laundry.

It is yet another object of the present invention to provide the method for washing laundry, which can prevent damage of the laundry due to steam having a high temperature when performing the laundry soaking operation using a small amount of water before supplying the steam.

It is yet another object of the present invention to provide the method for washing laundry, which performs the laundry soaking operation using the water maintained at a high temperature, thereby providing effect of swelling the laundry.

The objects of the present invention can be achieved by providing a method for washing laundry, comprising the steps of: primarily supplying water into a tub; and supplying steam by heating the water using a heater installed in the tub to generate the steam.

Preferably, the steam supplying step is performed in such a manner of controlling an amount of steam according to washing conditions such as an amount of laundry and a kind of laundry.

The method may further comprise circulating the water in the tub by using a circulation pump. With circulation of the water, the laundry is soaked, and a surface temperature of the tub or the drum is increased. In addition, the drum is preferably controlled to rotate.

The laundry soaking step to soak the laundry can be performed only by rotating the drum in a state wherein the water is contained in the tub. In addition, preferably, the laundry soaking step is performed after heating the water by using the heater in the tub. At this time, the water preferably has a temperature of 40~60° C.

When rotating the drum, it is possible to rotate the drum in one direction or to rotate the drum in a tumbling manner. Generally, the term "tumbling" means that the drum 130 is rotated at a low rotating speed less than a rotating speed causing the laundry to be brought into close contact with an inner wall 130 of the drum 130 by centrifugal force, that is, a rotating speed of generating centrifugal force less than 1 G, or that the drum 130 is alternately rotated at low speeds in clockwise and counterclockwise directions.

When performing the laundry soaking step, the water is absorbed into the laundry, thereby reducing an amount of water which will be used for generating steam. Accordingly, in order to additionally supply the water, the method may further comprise secondarily supplying the water.

In addition, when additionally supplying the water, the water is preferably supplied until it is determined through detection of a water level sensor that a water level reaches a preset water level. It is possible to perform accurate control on an amount of steam through confirmation of the water level.

Confirmation of the water level can also be performed at the primary water supplying step.

At the steam supplying step, the steam can be generated until it is determined through detection of the water level sensor that the water level reaches a preset water level. As a result, it is possible to control the amount of steam with accuracy, and to prevent problems, which can occur due to overheating of the heater caused by operating the heater in spite of an insufficient amount of water.

When it is necessary to additionally supply the steam, the water is additionally supplied, and in this case, the water is preferably supplied to the preset water level.

The steam may be supplied until it is determined through detection of the temperature sensor that the temperature increases to a preset temperature. Preferably, the temperature is the inner temperature of the tub. It is possible to control the inner temperature of the tub using the steam so as to be optimal with respect to an associated course.

It is possible to control supply of the steam based on a period of time. For example, it is possible to supply the steam for a predetermined period of time.

When supplying the water, it is preferable to supply warm water. If the steam is generated by heating cold water from an initial stage, it is undesirable in terms of energy efficiency. The warm water preferably has a temperature of 40~60° C.

In accordance with another aspect of the present invention, there is provided a method for controlling a washing machine, the washing machine comprising a tub to contain water, and a heater installed inside the tub, the method comprising the steps of: supplying water to a high water level into the tub until it is determined through detection of a water level sensor capable of detecting a high water level L1 and a low water level L2 that a level of the water has reached the high water level in the tub; and generating steam by controlling the heater until it is determined through detection of a temperature sensor that an inner temperature of the tub becomes a preset temperature.

The step of supplying the water to high water level may comprise: supplying water into the tub at an initial stage; detecting the water level in the tub by using the water level sensor; and additionally supplying the water into the tub if it is determined that the detected water level is lower than the high water level, discharging the water if it is determined that the detected water level is higher than the high water level, or stopping supply of the water if it is determined that the detected water level is the same as the high water level. These steps are provided for the purpose of accurately controlling the amount of steam while preventing excessive energy consumption. When generating the steam in a state of an excessive amount of water, it is undesirable in terms of energy efficiency.

In addition, the steam generating step may comprise detecting the water level by using the water level sensor; and controlling the heater to continue generation of steam if it is determined that the detected water level is higher than the low water level.

It should be noted that the present invention is not limited to the order of performing the steps as described above as long as the order of the steps satisfies the objects of the present invention, and that sequence of describing the steps of the method for controlling the washing machine in the above description does not mean an actual sequence of performing the steps of the method according to the present invention.

As apparent from the above description, the present invention has an advantageous effect in that, as the washing machine is structured to supply steam, it is possible to enhance efficiency of washing the laundry by using the steam. For example, the steam increases the temperature of atmosphere in the drum or the tub, thereby enhancing the washing effect. The increased temperature of the atmosphere prevents hot water from being rapidly cooled, thereby enhancing efficiency of the washing machine in terms of energy.

The washing machine has an additional advantageous effect in that, since steam having a high temperature is supplied to the laundry, the laundry is sterilized by the steam.

The washing machine of the present invention can obtain enhanced swelling effect, and enable efficient use of energy through circulation of water using the circulation pump.

Additionally, the washing machine can generate and supply a preset amount of steam according to the washing condition, thereby preventing waste of energy.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
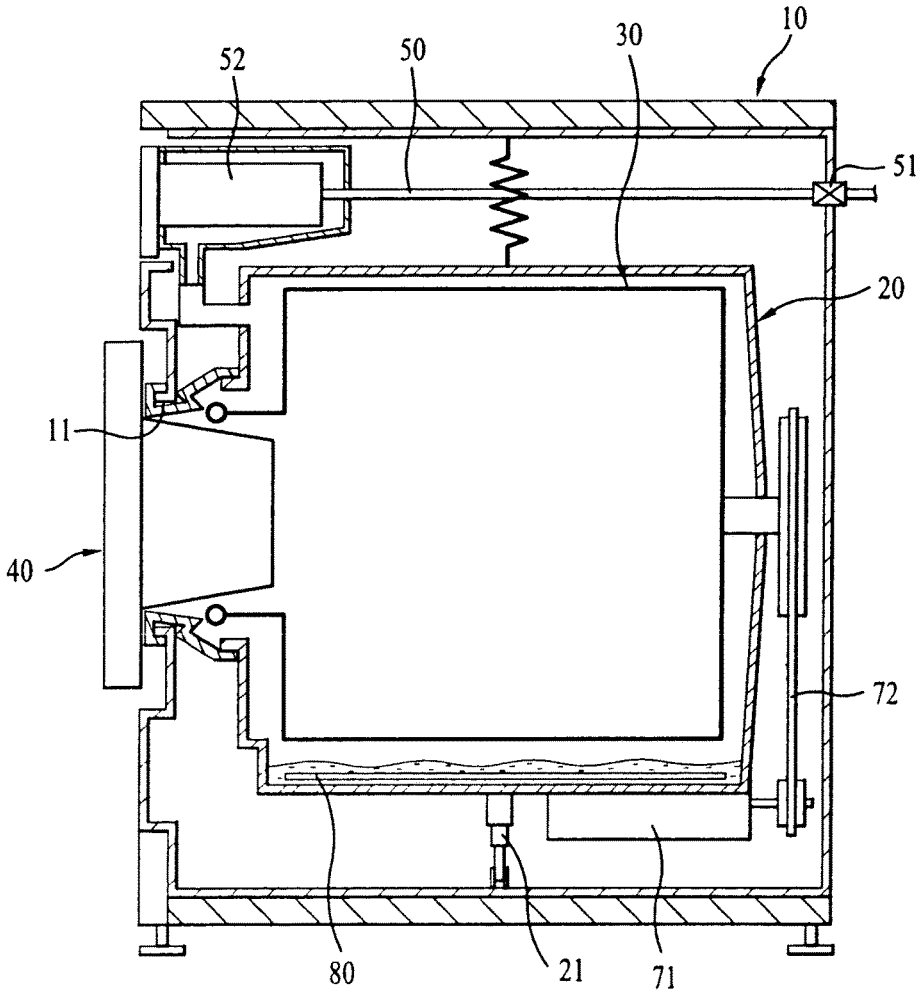
FIG. 1 is a side elevation illustrating an inner structure of a conventional drum type washing machine.
Figure 2:
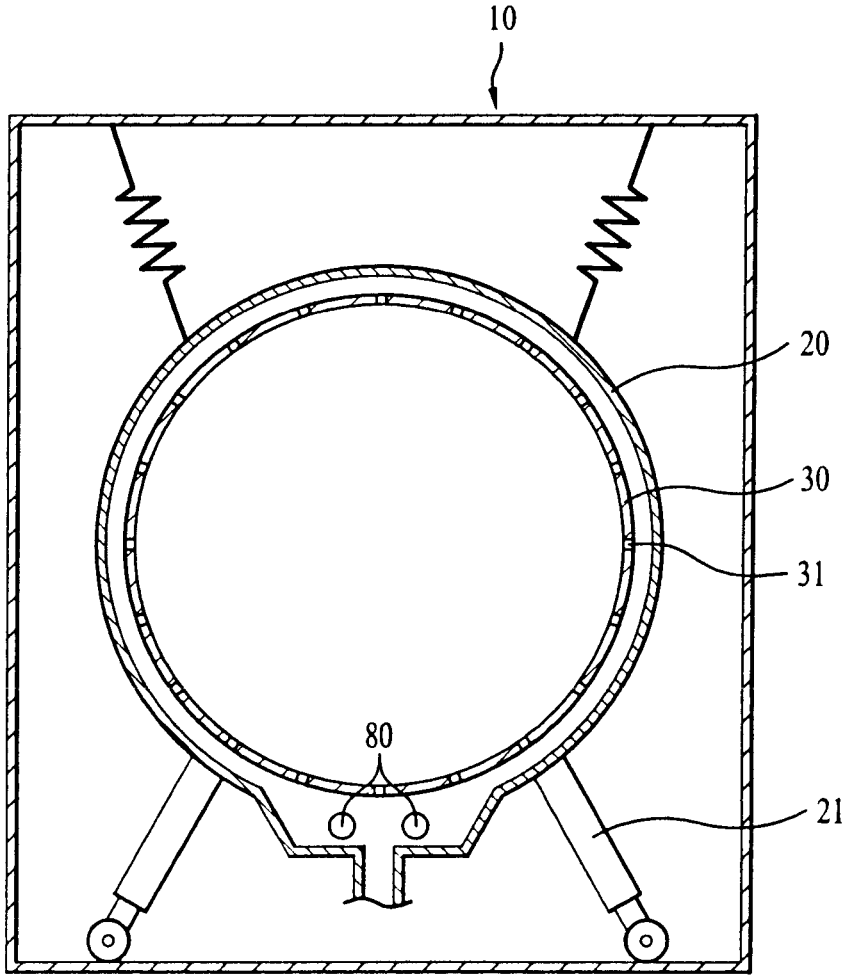
FIG. 2 is a front elevation illustrating the inner structure of the conventional drum type washing machine.
Figure 3:
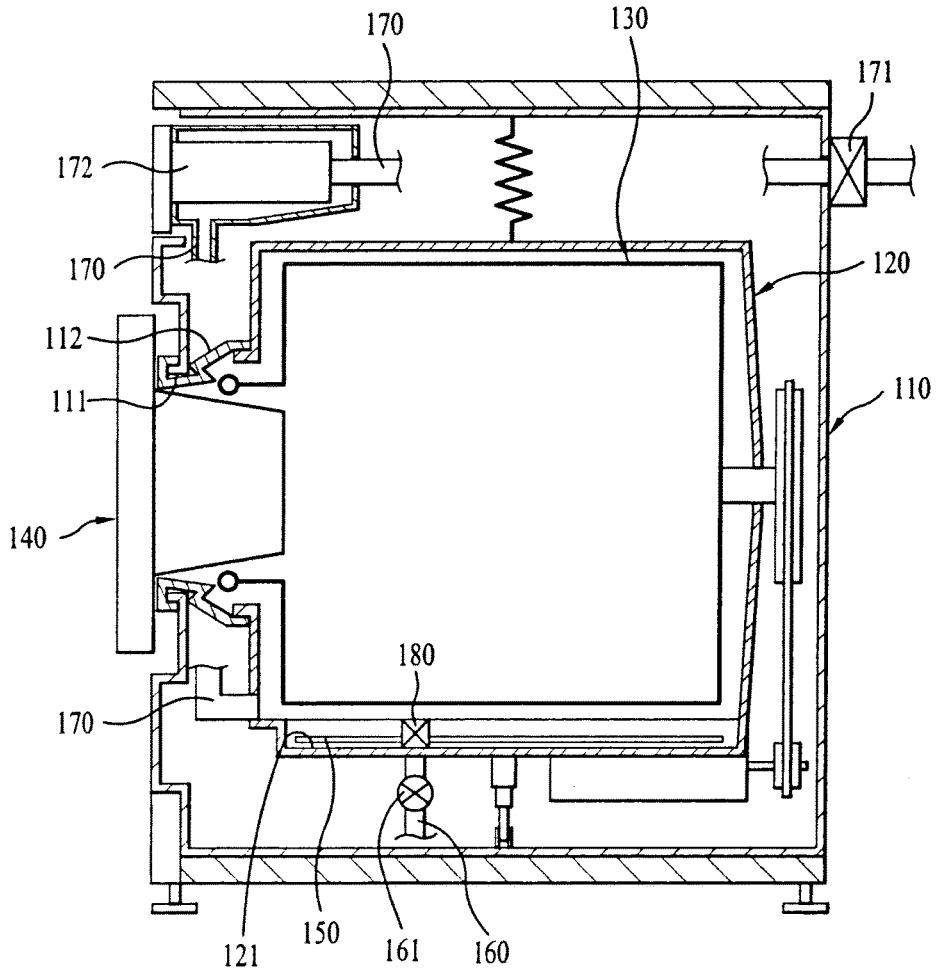
FIG. 3 is a side elevation illustrating an inner structure of a drum type washing machine in accordance with a preferred embodiment of the present invention.
Figure 4:
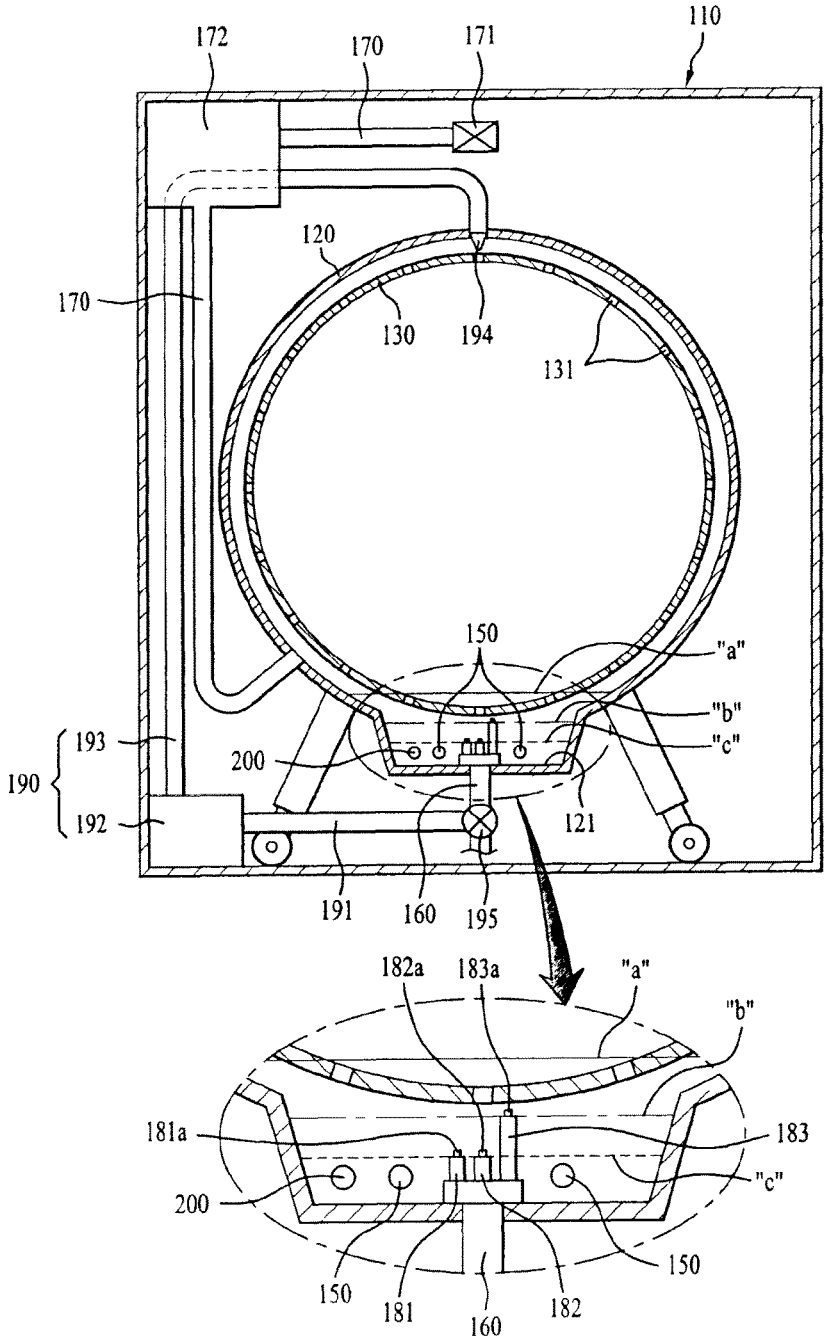
FIG. 4 is a front elevation illustrating the inner structure of the drum type washing machine in accordance with the embodiment of the present invention.

Referring to FIGS. 3 and 4, a washing machine according to an embodiment of the present invention generally comprises a body 110, an outer tub 120, a drum 130, a heater 150, a water supply pipe 170, a water level detection part 180, and a controller (not shown).

The body 110 defines an appearance of the washing machine.

The body 110 is formed at a front side thereof with an input port 111, and comprises a door 140 mounted thereon to open and close the input port 111.

The outer tub 120 is provided in the body 110 in a state of being supported in the body.

The outer tub 120 has a storage part 121 defined in a bottom space thereof to store a predetermined amount of water. The storage part 121 is protruded downwardly from the center of a peripheral surface of the outer tub 120.

The storage part 121 is connected with a drainage pipe 160 to drain water to an outside of the washing machine. The drainage pipe 160 is provided with a drainage valve 161 to open and close a passage through which the water is discharged to the outside.

The drum 130 is rotatably installed in the outer tub 120. The drum 130 has an opening facing the input port 111 of the body 110.

A rim 112 is provided between the input port 111 and the drum 130 to block a space to input laundry into the drum from a space within the body 110.

The drum 130 has a plurality of apertures 131 formed around a peripheral surface thereof. Water and steam is introduced into the drum 130 through the apertures.

The heater 150 is installed along an inner surface of the storage part 121 within the outer tub 120 to heat water supplied to the storage part.

Preferably, the body 110 is further provided with a temperature detection part 200 to detect an inner temperature of the outer tub 120. It is possible to control generation and supply of steam based on a detection result obtained by detecting the inner temperature of the tub 120. For example, it is possible to generate and supply the steam until the inner temperature of the tub 120 becomes a predetermined temperature.

The temperature detection part 200 is constituted by a typical thermistor or a typical thermostat, and is operated to cut off power to the heater 150 if the heater 150 is overheated. In this case, the temperature detection part 200 can be installed in the storage part 121 of the outer tub 120.

The water supply pipe 170 is a passage through which water flows within the washing machine, and serves to guide water supplied from a water pipe through a water supply valve 171 into the outer tub 120.

The washing machine further comprises a detergent storage part 172 at a passage of the water supply pipe 170 to store detergent required for washing operation such that the detergent is added to the water supplied into the outer tub 120.

The detergent storage part 172 is provided in an upper space inside the body 110, and is adapted to allow input of detergent.

According to the embodiment of the present invention, the water supply pipe 170 has an outlet port connected with a portion adjacent to the heater 150 around the bottom surface of the outer tub 120, that is, a portion of the outer tub 120 where the storage part 121 is formed.

This structure is devised to solve the problem of the prior art in that, if water is supplied into the washing machine via the structure of the prior art, the water is absorbed into laundry before being stored in the storage part 121 of the outer tub 120.

That is, in the prior art, as the water is absorbed into the laundry, it is difficult to supply an accurate amount of water to the storage part 121, which in turn makes it difficult to detect a level of the water stored in the storage part 121 with accuracy. On the contrary, according to the embodiment of the present invention, the water supply pipe is adapted to allow the water to be directly supplied to the storage part 121 without passing the laundry.

The water level detection part 180 is positioned between the heater 150 and the drum 130 within the storage part 121, and detects the level of the water stored in the storage part 121.

The water level detection part 180 comprises at least three electrodes 181, 182 and 183 such that the water level can be confirmed by supplying a voltage changing according to variation in electrical connection between the respective electrodes 181, 182 and 182 to the controller (not shown).

According to the embodiment of the present invention, the water level detection part 180 comprises a single common electrode 181, a single low level confirmation electrode 182, and a single high level confirmation electrode 183, distal ends of which are provided with terminals 181a, 182e and 182f exposed to surroundings (that is, an inner space of the storage part 121), respectively.

At this time, the terminal 181a of the common electrode 181 is located higher than the heater 150, and the terminal 182a of the low level confirmation electrode 182 is located substantially at the same height as that of the terminal 181a of the common electrode 181.

Preferably, the terminal 181a of the common electrode 181 and the terminal 182a of the low level confirmation electrode 182 are located at a height, which is approximately the same as a preset lowest level of water required for generation of steam while allowing the heater 150 to be immersed in the water.

In addition, the terminal 183a of the high level confirmation electrode 183 is located at a height, which is approximately the same as a preset highest level of water required for generation of steam above the terminal 181a of the common electrode 181 and the terminal 182a of the low level confirmation electrode 182.

Such structure of the water level detection part 180 is devised to prevent the heater 150 from being exposed to atmosphere while preventing the level of the water supplied to the storage part 121 of the outer tub 120 from exceeding a preset level.

The water circulation part 190 is adapted to inject water into a drum 130 while circulating the water supplied into the outer tub 120.

The water circulation part enables operation of soaking laundry to be performed efficiently through circulation of the water.

The water circulation part 190 comprises an inlet pipe 191 to receive water supplied from the outer tub 120, a circulation pump 912 provided at the inlet pipe 191 to pump the water, a guide pipe 193 to guide the water pumped by the circulation pump 192 into an upper space within the body 110, and an injection nozzle 194 coupled to an outlet of the guide pipe 193 and penetrating the rim 112 so as to be communicated with an inner upper end of the drum 110 to inject the water into the drum.

Preferably, the inlet pipe 191 is communicated with a drainage pipe 160. A valve 195 is provided to either the inlet pipe 191 or the drainage pipe 160 to selectively open and close the inlet pipe 191 and the drainage pipe 160.

The controller (not shown) selectively controls operation of the water supply valve 171 based on the value detected by the water level detection part 180, heating of the heater 150 based on the detected water level, and driving of the drum 130.

At this time, the controller can recognize a current water level by continuous confirmation of electrical connection between the common electrode 181 and the other electrodes 182 and 183 of the water level detection part 180, and control operation of the water supply valve 171 and the heater 150 based on the current water level.

The water level can be recognized in various manners.

According to one embodiment of the present invention, the controller receives a value (for example, voltage) detected by the water level detection part 180, and compares the detected value with a predetermined reference value, thereby recognizing the water level. At this time, the detection value is converted into digital data for comparison with the reference value.

If a digital value converted from the detection value is higher than the reference value, the terminals 181a, 182a and 183a of the electrodes 181, 182 and 183 are in a state of being exposed from the water. On the contrary, if the value converted from the detection value is lower than the reference value, the terminals 181a, 182a and 183a of the electrodes 181, 182 and 183 are in a state of being immersed in the water.

Figure 5:
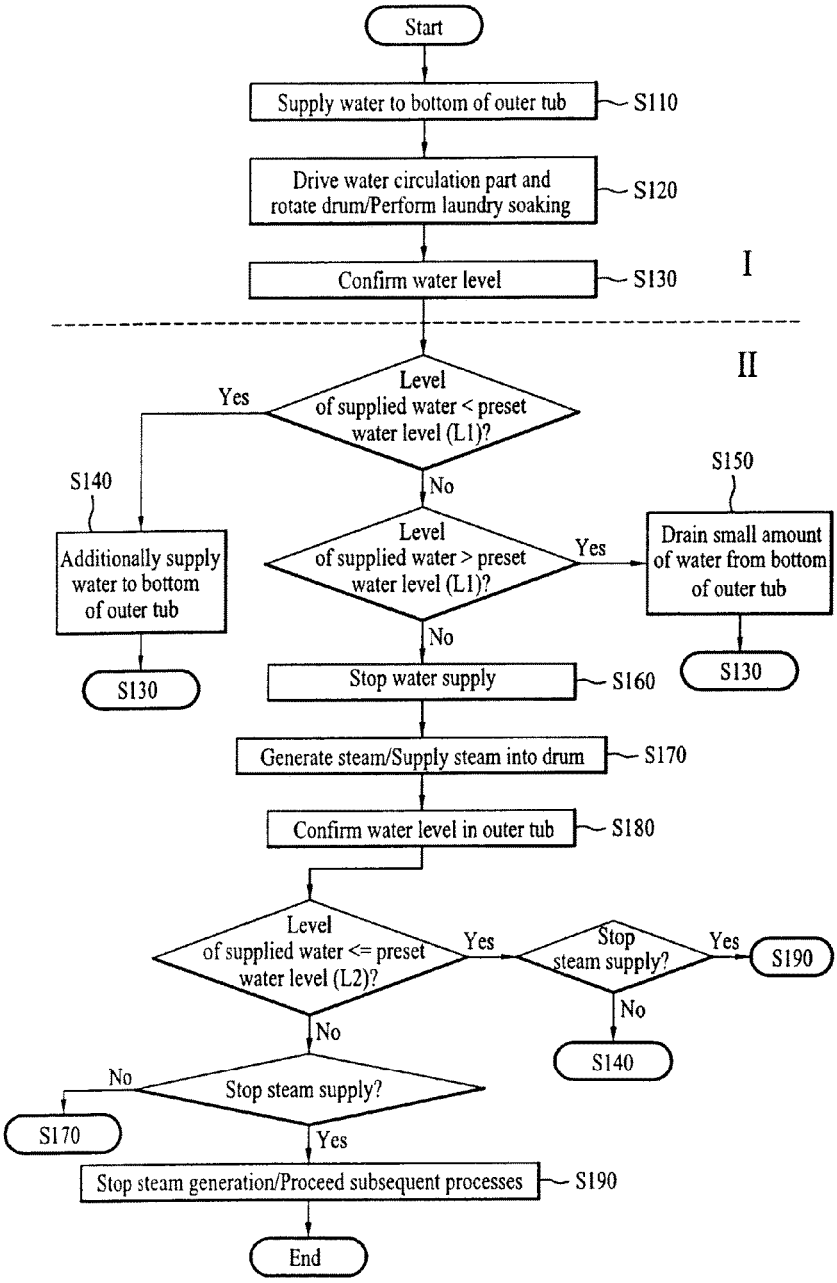
FIG. 5 is a flow diagram schematically illustrating a process of controlling the washing machine in accordance with a first embodiment of the present invention.

A method for washing laundry using the washing machine according to the embodiment will be described with reference to FIG. 5.

The method of washing the laundry according to this embodiment generally comprises a primary water supplying step, a laundry soaking step, a secondary water supplying step, and a steam supplying step, which will be sequentially described hereinafter.

At first, the controller to control washing operation of the washing machine can receive request from a user to perform the washing operation.

If there is a request for washing operation, the water supplying step is performed in such a way that the controller controls the water supply valve 171 to supply water to the bottom of the outer tub 120 (S110).

Then, water flows from the outside through the water supply pipe 170 opened by the water supply valve 171, is supplied into the outer tub 120 through a bottom space of the body 110, and fills up the outer tub 120 from the storage part 121. Since the outlet port of the water supply pipe 170 is connected with the lower side of the outer tub 120 around the peripheral surface thereof, the water does not soak the laundry within the drum 130 while being supplied to the outer tub.

In addition, the water is supplied into the tub to a such a degree that the bottom of the drum 130 is immersed in the water, and has a level (denoted by reference mark "a" in the drawing) which allows the laundry on the bottom of the drum 130 to be soaked therewith when the drum 130 is rotated.

Although confirmation of the water level can be performed by the water level detection part 180, when considering that the water level detection part 180 is used for generation of steam, it is desirable to perform the confirmation of the water level by using a separate sensor suitable to detect the water level or by measuring a period of time for which water is supplied.

If the water is supplied to the level set by the process as described above, the controller controls the water supply valve 171 to stop water supply.

After completing the water supplying step as described above, the laundry soaking step is performed to soak the laundry with water.

At this time, the laundry soaking step is performed through control of the water circulation part 190 (S120).

Specifically, when the circulation pump 192 is driven by the controller, water is pumped from the outer tub 120 through the inlet pipe 191, flows along the guide pipe 193, and is injected into the drum 130 through the injection nozzle 194.

As a result, the laundry is soaked with the water injected through the injection nozzle 194 in the drum 130.

Of course, it is more preferable that the drum 130 is continuously rotated (in one direction or alternately in right and left directions) to soak the laundry with the water injected through the injection nozzle 194 more efficiently.

The laundry soaking step is performed for a preset period of time.

After completing the laundry soaking step, the controller performs the water re-supplying step.

The water re-supplying step is a process to supply water required for generation of steam to a preset level.

Since the water level is rapidly reduced in the laundry soaking step, the amount of water actually used to generate steam becomes insufficient, and thus it is necessary to perform this step.

The water re-supplying step comprises confirming the water level through control of the water level detection part 180 (S130), and selectively controlling the water supply valve 171 according to the confirmed water level.

Confirmation of the water level is performed in such a way of comparing a detection value supplied from the high level confirmation electrode 183 of the water level detection part 180 with a preset reference value, and confirming whether or not a current level is lower than a preset maximum level L1.

If it is determined that the detection value is higher than the reference value due to electrical disconnection between the terminals 181a and 183a of the common electrode 181 and the high level confirmation electrode 183, the controller controls the water supply valve 171 to perform the water re-supplying step.

If it is determined that the detection value of the high level confirmation electrode 183 supplied from the water level detection part 180 is higher than the reference value, the controller controls the water supply valve 171 to additionally supply water into the outer tub 120 through the water supply pipe 170.

While the water is supplied to the outer tub 120, the controller receives the detection value of the high level confirmation electrode 183 supplied from the water level detection part 180, and determines a time for stopping water supply by comparing the detection value with the reference value.

At this time, since the water is directly supplied to the bottom space of the outer tub 120 without passing through the laundry, it is possible to determine the time for stopping the water supply with accuracy.

In other words, it is possible to prevent error in detection of water level due to absorption of water into the laundry, which can occur when the water passes through the laundry in the prior art.

Meanwhile, when confirming the level of water used for generating the steam after the laundry soaking step and before the water re-supplying step, there may occur a case where the detection value supplied from the high level confirmation electrode 183 is lower than the preset reference value.

This case can occur when the water supplied for the laundry soaking step is excessive.

Accordingly, if the water level exceeds the preset maximum level L1, it is desirable to control the drainage valve 161 to drain a small amount of water from the storage part 121 through the water drainage pipe 160 (S150).

In other words, since an excessive amount of water supplied into the storage part 121 inevitably increases power consumption required to evaporate the water, it is most desirable to provide a suitable level of water to the storage part.

In addition, when water is supplied in such an amount that a level of the water contained in the storage part 121 of the outer tub 120 reaches a height set to the maximum level (denoted by reference mark "b" in the drawing) required to generate the steam, the controller stops the water supply (S160).

Then, the controller performs the steam supplying step to generate and supply steam into the drum 130 (S170). At this time, a detection value of the high level confirmation electrode 183 is lower than the reference value.

The steam is generated via heat generation of the heater 150.

That is, when the controller controls the heater 150 to generate heat, the water in the storage part 121 evaporates, and generates steam having a high temperature.

Additionally, the steam of the high temperature rises from the bottom space within the outer tub, and flows into the drum 130 through the apertures 131 of the drum 130.

As a result, laundry within the drum 130 is supplied with the steam of the high temperature, which enables separation and sterilization of contaminants.

In particular, when considering that the steam is supplied to the laundry while rising from the bottom of the drum 130, the laundry is washed and sterilized in, for example, a smothering manner.

At this time, it is more preferable to control the drum 130 to rotate and cause the steam to be uniformly supplied to all the laundry within the drum 130.

In addition, while performing the steam supplying step as described above, the controller continuously confirms the water level in the storage part 121, which is a level of the water on the bottom of the outer tub 120, in such a way of receiving a detection value supplied from the low level confirmation electrode 182 of the water level detection part 180, and comparing the detection value with the reference value (S180).

This step is performed for the purpose of preventing the water level in the storage part 121 from being lowered below a preset minimum level L2 (approximately similar to a height of the heater denoted by reference mark "c" in the drawing).

At this time, if it is determined that the detection value supplied from the low level confirmation electrode 182 is higher than the reference value, the controller controls the heater 150 to stop heat generation, and controls the water supply valve 171 to additionally supply water into the storage part 121 (S140).

When additionally supplying the water, the time for stopping the water supply is determined through comparison of a detection value supplied from the high level confirmation electrode 183 with the reference value.

If it is determined that the water level is not the preset lowest water level or less, it is determined whether or not steam supply must be stopped or continued.

Determination whether or not the steam supply must be stopped is performed using the temperature sensor installed in the tub. Specifically, if the temperature of the tub reaches a target temperature, the steam supply is stopped. Alternatively, the steam supply can be stopped if it is determined that a period of time for supplying the steam has reached a target period after measuring the period. In another example, it is possible to supply and stop the steam based on the number of cycles, for example, one cycle or two cycles, assuming that one cycle refers to a period from a high water level detected by the high level confirmation electrode to a low water level detected by the low level confirmation electrode.

When the steam supplying step is finished, steam is not generated any more, and post-processes for washing the laundry, such as a washing process, a rinsing process, and a spin-drying process, are sequentially performed (S190).

Figure 6:
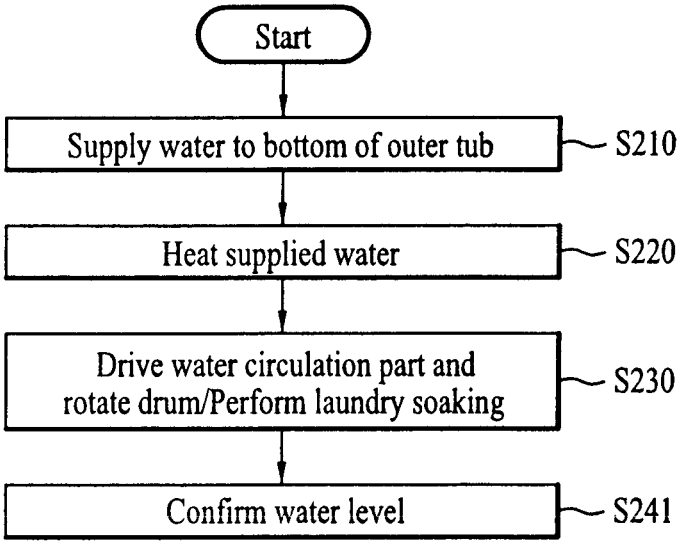
FIG. 6 is a flow diagram schematically illustrating a process of controlling the washing machine in accordance with a second embodiment of the present invention.
Figure 7:
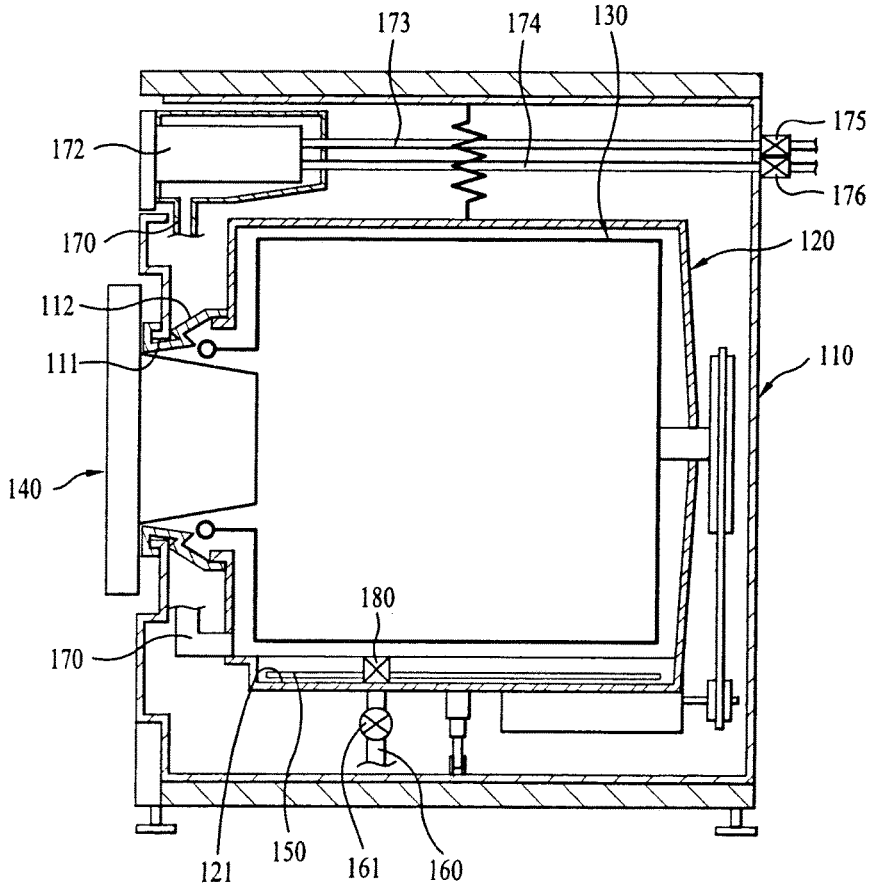
FIG. 7 is a side elevation illustrating an inner structure of a drum type washing machine in accordance with a third embodiment of the present invention.

A method of washing laundry in accordance with a second embodiment of the present invention will be described with reference to FIG. 6.

The method of washing the laundry according to this embodiment generally comprises a primary water supplying step, a heating step, a laundry soaking step, a secondary water supplying step, and a steam supplying step. FIG. 6 shows only the steps corresponding to Section I of FIG. 5, and the subsequent steps of the second embodiment are the same as those of Section II of FIG. 5.

At first, the controller to control washing operation of the washing machine can receive request from a user to perform the washing operation.

If there is a request for washing operation, the water supplying step is performed in such a way that the controller controls the water supply valve 171 to supply water to the bottom of the outer tub 120 (S210).

Then, the water flows from the outside through the water supply pipe 170 opened by the water supply valve 171, is supplied into the outer tub 120 through a bottom space of the body 110, and fills up the outer tub 120 from the storage part 121. Since the outlet port of the water supply pipe 170 is connected with the lower side of the outer tub 120 around the peripheral surface thereof, the water does not soak the laundry within the drum 130 while being supplied to the outer tub.

In addition, the water is supplied into the tub to a such a degree that the bottom of the drum 130 is immersed in the water, and has a level (denoted by reference mark "a" in the drawing) which allows the laundry on the bottom of the drum 130 to be soaked therewith when the drum 130 is rotated.

Although confirmation of a water level can be performed by the water level detection part 180, when considering that the water level detection part 180 is used for generation of steam, it is desirable to perform the confirmation of the water level by using a separate sensor suitable to detect the water level or by measuring a period of time for which water is supplied.

If the water is supplied to the level set by the process as described above, the controller controls the water supply valve 171 to stop water supply.

Then, the controller performs the heating step.

At the heating step, the heater 150 heats the water to a preset temperature (S220).

The preset temperature is in the range of about 40~60° C., which can provide excellent washing performance for general laundry.

The temperature of water is detected by the temperature sensor 200, and is then sent to the controller.

When the water supplied into the washing machine has a temperature in the range of about 40~60° C., the controller stops heat generation of the heater 150.

After completing the heating step as described above, the laundry soaking step is performed to soak the laundry with water.

According to the second embodiment, the laundry soaking step is performed through control of the water circulation part 190 (S230).

Specifically, when the water circulation part 192 is driven by the controller, water is pumped from the outer tub 120 through the inlet pipe 191, flows along the guide pipe 193, and is injected into the drum 130 through the injection nozzle 194.

As a result, the laundry is soaked with the water injected through the injection nozzle 194 within the drum 130.

Of course, it is more preferable that the drum 130 continuously rotates (rotates in one direction or alternates in right and left directions) to soak the laundry with the water injected through the injection nozzle 194 more efficiently.

The laundry soaking step is performed for a preset period of time.

The laundry soaking step is performed to prevent the laundry from being damaged due to rapid variation in temperature which can occur when the steam having a high temperature is supplied to the laundry in a dry state, and allows the laundry to be in a soaked state before the steam is supplied to the laundry. In other words, with the laundry soaking step, it is possible to suppress damage of the laundry even when the steam of the high temperature is supplied to the laundry. In addition, the laundry soaking step provides swelling effect of the laundry.

After completing the laundry soaking step, a water level is confirmed (S241). Since the subsequent steps of the second embodiment are the same as those of Section II of FIG. 5, description thereof will be omitted hereinafter.

In the above embodiment, the heating step is performed when the water supplied into the outer tub 120 has a temperature less than 40° C.

On the contrary, when the water supplied into the outer tub 120 has a temperature of 40° C. or more, it is not necessary to perform the heating step described above.

In this regard, according to a third embodiment of the present invention, washing operation is performed using a washing machine in which a water supplying pipe 170 is divided into a cold water supplying pipe 173 and a hot water supplying pipe 174 having a cold-water supplying valve 175 and a hot-water supplying valve 176, respectively.

Figure 8:
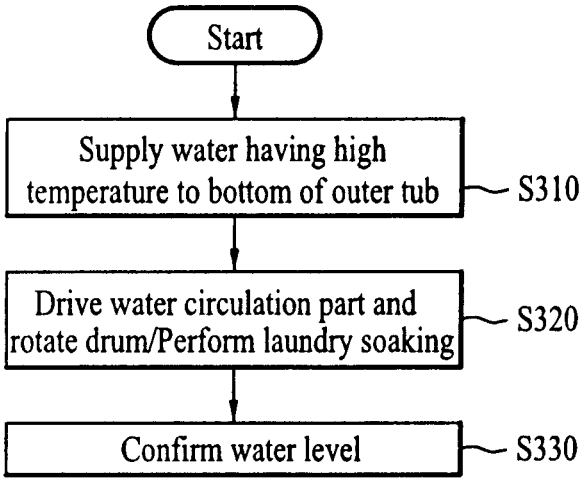
FIG. 8 is a flow diagram schematically illustrating a process of controlling the washing machine in accordance with a third embodiment of the present invention.

A method for washing laundry according to the third embodiment will be described with reference to FIG. 8.

The method of washing the laundry according to this embodiment generally comprises a primary water supplying step, a laundry soaking step, a secondary water supplying step, and a steam supplying step. FIG. 8 shows only the steps corresponding to Section I of FIG. 5, and the subsequent steps of the third embodiment are the same as those of Section II of FIG. 5.

According to the third embodiment, the primary water supplying step is performed in such a way of supplying water having a high temperature to the bottom of the outer tub 120 (S310) unlike the primary water supplying step of the second embodiment.

In other words, the water of the high temperature is supplied to the outer tub by controlling the respective water supplying valves 175 and 176 of the cold water supplying pipe 173 and the hot water supplying pipe 174.

The reason of supplying the water having a lower temperature through the cold water supplying pipe 173 is to prevent the temperature of water from exceeding 60° C.

That is, when the temperature of water exceeds 60° C., cold water is supplied.

Of course, although the water having a temperature exceeding 60° C. does not cause a significant difference in washing performance, there is possibility of wasting power (for example, wasting power for rapid heating of a boiler) for generating water having the high temperature.

A series of processes to control the temperature of the water to have a preset temperature range as described above is performed via control of selectively opening and closing the water supplying valves 175 and 176 based on the temperature detected in real time by the temperature detection part 200.

In Particular, at the primary water supplying step, the water is preferably supplied into the washing machine such that the bottom of the drum 130 is substantially immersed in the water.

After completing the primary water supplying step described above, the laundry soaking step is performed to soak the laundry with water.

The laundry soaking step is performed through driving control of the water circulation part 190 (S320).

Specifically, when the water circulation part 192 is driven by the controller, water is pumped from the outer tub 120 through the inlet pipe 191, flows along the guide pipe 193, and is injected into the drum 130 through the injection nozzle 194. As a result, the laundry is soaked with the water injected through the injection nozzle 194 within the drum 130.

Detailed description of a process of controlling the water circulation part for laundry soaking step is the same as that of the second embodiment.

After completing the laundry soaking step, a water level is confirmed (S330). Since the subsequent steps of the third embodiment are the same as those of Section II of FIG. 5, description thereof will be omitted hereinafter.

Figure 9:
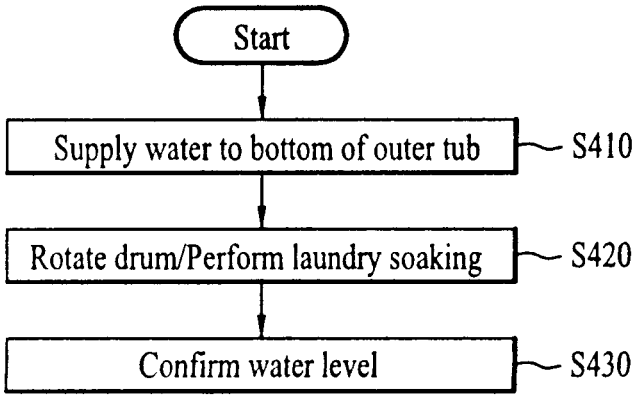
FIG. 9 is a flow diagram schematically illustrating a process of controlling the washing machine in accordance with a fourth embodiment of the present invention.

A method for washing laundry according to a fourth embodiment will be described with reference to FIG. 9.

The method of washing the laundry according to this embodiment generally comprises a primary water supplying step, a laundry soaking step, a secondary water supplying step, and a steam supplying step. FIG. 9 shows only the steps corresponding to Section I of FIG. 5, and the subsequent steps of the second embodiment are the same as those of Section II of FIG. 5.

At first, the controller to control washing operation of the washing machine can receive request from a user to perform the washing operation.

If there is a request for washing operation, the controller performs the primary water supplying step.

The primary water supplying step is performed in such a way that the controller controls the water supply valve 171 to supply water into the outer tub 120 (S410).

Then, the water flows from the outside through the water supply pipe 170 opened by the water supply valve 171, is supplied into the outer tub 120 through a bottom space of the body 110, and fills up the outer tub 120 from the storage part 121. Since the outlet port of the water supply pipe 170 is connected with the lower side of the outer tub 120 around the peripheral surface thereof, the water does not soak the laundry within the drum 130 while being supplied to the outer tub.

At the primary water supplying step, the water has a temperature less than 40° C.

In addition, the water is supplied into the tub to a such a degree that the bottom of the drum 130 is immersed in the water, and has a level (denoted by reference mark "a" in the drawing) which allows the laundry on the bottom of the drum 130 to be soaked therewith when the drum 130 is rotated.

Although confirmation of the water level can be performed by the water level detection part 180, when considering that the water level detection part 180 is used for generation of steam, it is desirable to perform the confirmation of the water level by using a separate sensor suitable to detect the water level or by measuring a period of time for which water is supplied.

If the water is supplied to the level set by the process as described above, the controller controls the water supply valve 171 to stop water supply.

Then, the laundry soaking step is performed by control of the controller with respect to the drum.

The laundry soaking step is performed in such a way of rotating the drum 130 to soak the laundry with the water (S420).

That is, as the drum 130 is rotated, the laundry in the drum 130 is moved, and is soaked with the water supplied onto the bottom surface the drum 130.

At this time, the drum 130 is controlled to rotate only in one direction (for example, in the clockwise direction). Alternatively, the drum 130 is controlled to repetitively alternate in two directions (for example, in the clockwise and counterclockwise directions) at a predetermined cycle. The laundry soaking step is performed for a preset period of time.

The laundry soaking step is performed to prevent the laundry from being damaged due to rapid variation in temperature which can occur when the steam having a high temperature is supplied to the laundry in a dry state, and allows the laundry to be in a soaked state before the steam is supplied to the laundry. That is, with the laundry soaking step, it is possible to suppress damage of the laundry even when the steam of the high temperature is supplied to the laundry. In addition, the laundry soaking step provides swelling effect of the laundry.

After completing the laundry soaking step, a water level is confirmed (S430). Since the subsequent steps of the forth embodiment are the same as those of Section II of FIG. 5, description thereof will be omitted hereinafter.

Figure 10:
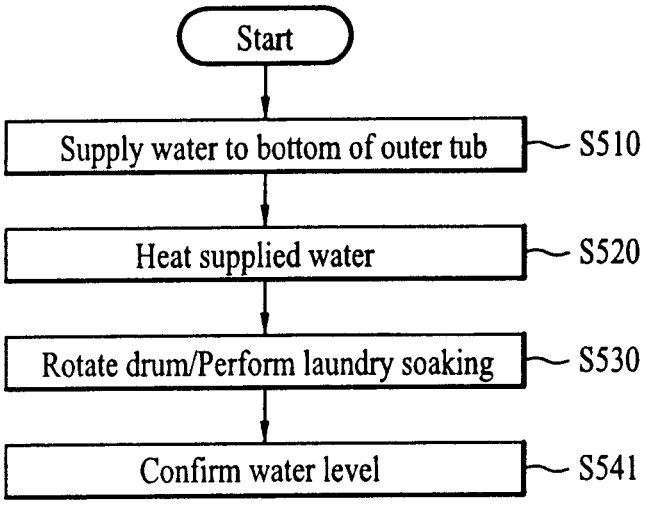
FIG. 10 is a flow diagram schematically illustrating a process of controlling the washing machine in accordance with a fifth embodiment of the present invention.

A method for washing laundry according to a fifth embodiment will be described with reference to FIG. 10.

The method of washing the laundry according to this embodiment generally comprises a primary water supplying step, a heating step, a laundry soaking step, a secondary water supplying step, and a steam supplying step. FIG. 10 shows only the steps corresponding to Section I of FIG. 5, and the subsequent steps of the second embodiment are the same as those of Section II of FIG. 5.

At first, the controller to control washing operation of the washing machine can receive request from a user to perform the washing operation.

If there is a request for washing operation, the controller performs the primary water supplying step.

The primary water supplying step is performed in such a way that the controller controls the water supply valve 171 to supply water into the outer tub 120 (S510).

Then, the water flows from the outside through the water supply pipe 170 opened by the water supply valve 171, is supplied into the outer tub 120 through a bottom space of the body 110, and fills up the outer tub 120 from the storage part 121. Since the outlet port of the water supply pipe 170 is connected with the lower side of the outer tub 120 around the peripheral surface thereof, the water does not soak the laundry within the drum 130 while being supplied to the outer tub.

At the primary water supplying step, the water has a temperature less than 40° C.

In addition, the water is supplied into the tub to a such a degree that the bottom of the drum 130 is immersed in the water, and has a level (denoted by reference mark "a" in the drawing) which allows the laundry on the bottom of the drum 130 to be soaked therewith when the drum 130 is rotated.

Although confirmation of the water level can be performed by the water level detection part 180, when considering that the water level detection part 180 is used for generation of steam, it is desirable to perform the confirmation of the water level by using a separate sensor suitable to detect the water level or by measuring a period of time for which water is supplied.

If the water is supplied to the level set by the process as described above, the controller controls the water supply valve 171 to stop water supply.

Then, the controller performs the heating step.

At the heating step, the heater 150 heats the water to a preset temperature (S520).

The preset temperature is in the range of about 40~60° C., which can provide excellent washing performance for general laundry.

The temperature of water is detected by the temperature sensor 200, and is then sent to the controller.

When the water supplied into the washing machine has a temperature in the range of about 40~60° C., the controller stops heat generation of the heater 150.

Then, the laundry soaking step is performed by control of the controller with respect to the drum 130.

The laundry soaking step is performed in such a way of rotating the drum 130 to soak the laundry with the water (S130).

That is, as the drum 130 is rotated, the laundry in the drum 130 is moved, and is soaked with water supplied onto the bottom surface the drum 130.

At this time, the drum 130 is controlled to rotate only in one direction (for example, in the clockwise direction). Alternatively, the drum 130 is controlled to repetitively alternate in two directions (for example, in the clockwise and counterclockwise directions) at a predetermined cycle. The laundry soaking step is performed for a preset period of time.

As described above, the laundry soaking step is performed to prevent the laundry from being damaged due to rapid variation in temperature which can occur when the steam having a high temperature is supplied to the laundry in a dry state, and allows the laundry to be in a soaked state before the steam is supplied to the laundry. That is, with the laundry soaking step, it is possible to suppress damage of the laundry even when the steam of the high temperature is supplied to the laundry. In addition, the laundry soaking step provides swelling effect of the laundry.

After completing the laundry soaking step, a water level is confirmed (S541). Since the subsequent steps of the fifth embodiment are the same as those of Section II of FIG. 5, description thereof will be omitted hereinafter.

In the fifth embodiment, the heating step is performed when the water supplied into the outer tub 120 has a temperature less than 40° C.

On the contrary, when the water supplied into the outer tub 120 has a temperature of 40° C. or more, it is not necessary to perform the heating step described above.

In this regard, according to a sixth embodiment of the present invention, washing operation is performed using a washing machine in which a water supplying pipe 170 is divided into a cold water supplying pipe 173 and a hot water supplying pipe 174 having a cold-water supplying valve 175 and a hot-water supplying valve 176, respectively.

Figure 11:
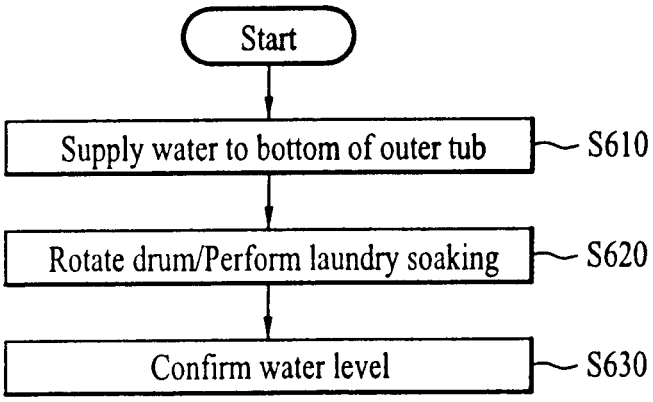
FIG. 11 is a flow diagram schematically illustrating a process of controlling the washing machine in accordance with a sixth embodiment of the present invention.

A method for washing laundry according to the sixth embodiment will be described with reference to FIG. 11.

The method of washing the laundry according to this embodiment generally comprises a primary water supplying step, a laundry soaking step, a secondary water supplying step, and a steam supplying step. FIG. 10 shows only the steps corresponding to Section I of FIG. 5, and the subsequent steps of the second embodiment are the same as those of Section II of FIG. 5.

According to the sixth embodiment, the primary water supplying step is performed in such a way of supplying water having a high temperature to the bottom of the outer tub 120 (S610) unlike the primary water supplying step of the second embodiment.

In other words, the water of the high temperature is supplied to the outer tub by controlling the respective water supplying valves 175 and 176 of the cold water supplying pipe 173 and the hot water supplying pipe 174.

The reason of supplying the water having a lower temperature through the cold water supplying pipe 173 is to prevent the temperature of water from exceeding 60° C.

That is, when the temperature of water exceeds 60° C., cold water is supplied.

Of course, although the water having a temperature exceeding 60° C. does not cause a significant difference in washing performance, there is possibility of wasting power (for example, wasting power for rapid heating of a boiler) for generating water having the high temperature.

A series of processes to control the temperature of the water to have a preset temperature range as described above is performed via control of selectively opening and closing the water supplying valves 175 and 176 based on the temperature detected in real time by the temperature detection part 200.

In particular, at the primary water supplying step, the water is preferably supplied into the washing machine such that the bottom of the drum 130 is substantially immersed in the water.

After completing the primary water supplying step described above, the laundry soaking step is performed while rotating the drum 130 (S620).

At this time, the drum 130 is controlled to rotate only in one direction. Alternatively, the drum 130 is controlled to repetitively alternate in two directions (for example, in the clockwise and counterclockwise directions) at a predetermined cycle.

Detailed description of the process for controlling the drum 130 for the laundry soaking step is the same as that of the fifth embodiment.

After completing the laundry soaking step, a water level is confirmed (S630). Since the subsequent steps of the sixth embodiment are the same as those of Section II of FIG. 5, description thereof will be omitted hereinafter.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention relates to a washing machine, and more particularly, to a method for washing laundry using steam, which can enhance washing performance, and enable sterilization of the laundry while preventing damage of cloth due to the steam.

As apparent from the above description, the present invention has an advantageous effect in that, as the washing machine is structured to supply steam, it is possible to enhance efficiency of washing the laundry by using the steam. For example, the steam increases the temperature of atmosphere in the drum or the tub, thereby enhancing the washing effect. The increased temperature of the atmosphere prevents hot water from being rapidly cooled, thereby enhancing efficiency of the washing machine in terms of energy.

The washing machine has an additional advantageous effect in that, since the steam having a high temperature is supplied to the laundry, the laundry is sterilized by the steam.

The washing machine can obtain enhanced swelling effect, and enable efficient use of energy through circulation of water using the circulation pump.

Additionally, the washing machine can generate and supply a preset amount of steam according to washing condition, thereby preventing waste of energy.

What is claimed is:

1. A method of controlling a washing operation of a washing machine having a tub containing water, a drum rotatably installed in the tub, and a heater installed in *a storage part of* the tub to heat water supplied to the tub, and a water supply pipe to guide water supplied from a water pipe through a water supply valve into the tub, comprising:

*washing a laundry, the washing laundry including:* supplying water into the tub through the water supply pipe*, the supplying the water including forming in the tub a level that allows the laundry on a bottom of the drum to be soaked when the drum is rotated*;

soaking [a] *the* laundry with the water by rotating the drum*, the soaking the laundry further comprising heating the water in the tub to between 40-60° C. using the heater*;

after completing the soaking the laundry, re-supplying water in the tub through the water supply pipe for controlling [a] *the* water level in the tub to be a preset level required for a generation of steam; and generating the steam by heating the water in the tub using the heater, and supplying the steam into the drum through apertures of the drum[,]*;*

*rinsing the laundry after the washing is finished; and*

*spin-drying the laundry after the rinsing is finished,* wherein the [supplying] *re-supplying* the water includes supplying the water in the vicinity of [a] *the* storage part provided at a bottom of the tub to allow the water to be supplied to the storage part without passing the laundry, [and]

wherein the preset level in the re-supplying is a level that allows the heater to be submerged in the water, while not allowing a bottom of the drum to be submerged in the water*, and*

*wherein the soaking the laundry further includes circulating the water heated by the heater provided in the storage part through a circulation pump along a circulation path to an injection nozzle where the heated water is injected into an upper space within the tub.*

2. The method according to claim 1, wherein the supplying the water includes forming in the tub a level that allows the laundry on the bottom of the drum to be soaked when the drum is rotated.

[3. The method according to claim 1, wherein the soaking the laundry further comprises circulating the water in the tub.]

4. The method according to claim 1, wherein the soaking the laundry further comprises heating the water in the tub.

5. The method according to claim 1, wherein the supplying the steam includes supplying the steam until an inner temperature of the tub reaches a preset temperature.

6. The method according to claim 1, wherein the supplying the steam includes supplying the steam until a preset time period is expired.

7. The method according to claim 1, wherein the supplying the steam includes supplying the steam until the water level in the tub is lowered to a preset minimum level.

8. The method according to claim 7, wherein the supplying the steam further comprises further supplying the water to the tub until the preset level is reached, if the water level in the tub is less than the preset minimum level.

[9. The method according to claim 1, further comprising rinsing and spin-drying the laundry after the supplying the steam is completed.]

10. The method according to claim 1, further comprising discharging water in the tub through a water drain pipe for generating the steam, after the soaking the laundry and before the re-supplying the water.

11. A method of controlling a washing operation of a washing machine having a tub containing water, a drum rotatably installed in the tub, a heater installed in *a storage part of* the tub to heat water supplied to the tub, and a water supply pipe to guide water supplied from a water pipe through a water supply valve into the tub, comprising:

*washing a laundry, the washing laundry including:* supplying water into the tub through the water supply pipe*, the supplying the water including forming in the tub a level that allows the laundry on a bottom of the drum to be soaked when the drum is rotated*;

soaking [a] *the* laundry with the water by rotating the drum*, the soaking the laundry further comprising heating the water in the tub to between 40-60° C. using the heater*;

after completing the soaking the laundry, discharging water in the tub through a water drainage pipe *and re-supplying water in the tub through the water supply pipe* for controlling [a] *the* water level in the tub to be a preset level required for a generation of steam; and generating the steam by heating the water in the tub using the heater, and supplying the steam into the drum through apertures of the drum[,]*;*

*rinsing the laundry after the washing is finished; and*

*spin-drying the laundry after the rinsing is finished,* wherein the [supplying] *re-supplying* the water includes supplying the water in the vicinity of [a] *the* storage part provided at a bottom of the tub to allow the water to be supplied to the storage part without passing the laundry, [and]

wherein the preset level in the re-supplying is a level that allows the heater to be submerged in the water, while not allowing a bottom of the drum to be submerged in the water*, and*

*wherein the soaking the laundry further includes circulating the water heated by the heater provided in the storage part through a circulation pump along a circulation path to an injection nozzle where the heated water is injected into an upper space within the tub.*

12. The method according to claim 11, further comprising re-supplying water in the tub through the water supply pipe for controlling a water level in the tub to be the preset level required for a generation of steam, after the discharging the water.

[13. The method according to claim 11, wherein the soaking the laundry further comprises circulating the water in the tub.]

14. The method according to claim 11, wherein the supplying the steam includes supplying the steam until an inner temperature of the tub reaches a preset temperature.

15. The method according to claim 11, wherein the supplying the steam includes supplying the steam until a preset time period is expired.

16. The method according to claim 11, wherein the supplying the steam includes supplying the steam until the water level in the tub is lowered to a preset minimum level.

*17. A method of controlling a washing operation of a washing machine having a tub containing water, a drum rotatably installed in the tub, and a heater installed in a storage part of the tub to heat water supplied to the tub, and a water supply pipe to guide water supplied from a water pipe through a water supply valve into the tub, comprising:*

*washing a laundry, the washing laundry including:*

*supplying water into the tub, the water being supplied into the tub such that a bottom of the drum is immersed in the water, forming a level that allows the laundry on the bottom of the drum to be soaked when the drum is rotated;*

*soaking the laundry with the water by rotating the drum, the soaking the laundry further comprising heating the water in the tub to between 40-60° C. using the heater;*

*after completing the soaking the laundry, re-supplying water in the tub through the water supply pipe for controlling the water level in the tub to be a preset level required for a generation of steam; and*

*generating the steam by heating the water in the tub using the heater, and supplying the steam into the drum through apertures of the drum;*

*rinsing the laundry after the washing is finished; and*

*spin-drying the laundry after the rinsing is finished,*

*wherein, at the re-supplying the water, the water is supplied in the vicinity of the storage part provided at a bottom of the tub to allow the water to be supplied to the storage part without passing the laundry,*

*wherein the preset level in the re-supplying is a level that allows the heater to be submerged in the water, while not allowing the bottom of the drum to be submerged in the water, and*

*wherein the soaking the laundry further includes circulating the water heated by the heater provided in the storage part through a circulation pump along a circulation path to an injection nozzle where the heated water is injected into an upper space within the tub.*

*18. The method according to claim 17, wherein the supplying the water includes forming in the tub a level that allows the laundry on the bottom of the drum to be soaked when the drum is rotated.*

*19. The method according to claim 17, wherein the soaking the laundry further comprises heating the water in the tub.*

*20. The method according to claim 17, wherein the supplying the steam includes supplying the steam until an inner temperature of the tub reaches a preset temperature.*

*21. The method according to claim 17, wherein the supplying the steam includes supplying the steam until a preset time period is expired.*

*22. The method according to claim 17, wherein the supplying the steam includes supplying the steam until the water level in the tub is lowered to a preset minimum level.*

*23. The method according to claim 22, wherein the supplying the steam further comprises further supplying the water to the tub until the preset level is reached, if the water level in the tub is less than the preset minimum level.*

*24. The method according to claim 17, further comprising discharging water in the tub through a water drain pipe for generating the steam, after the soaking the laundry and before the re-supplying the water.*

*25. A method of controlling a washing operation of a washing machine having a tub containing water, a drum rotatably installed in the tub, and a heater installed in a storage part of the tub to heat water supplied to the tub, and a water supply pipe to guide water supplied from a water pipe through a water supply valve into the tub, comprising:*

*washing a laundry, the washing laundry including:*

*supplying water into the tub, the water being supplied into the tub such that a bottom of the drum is immersed in the water, forming a level that allows the laundry on the bottom of the drum to be soaked when the drum is rotated;*

*soaking a laundry with the water by rotating the drum, the soaking the laundry further comprising heating the water in the tub to between 40-60° C. using the heater;*

*after completing the soaking the laundry, discharging water in the tub through a water drainage pipe for controlling the water level in the tub to be a preset level required for a generation of steam;*

*after discharging the water, re-supplying water in the tub through the water supply pipe for controlling the preset level; and*

*generating the steam by heating the water in the tub using the heater, and supplying the steam into the drum through apertures of the drum;*

*rinsing the laundry after the washing is finished; and*

*spin-drying the laundry after the rinsing is finished,*

*wherein, at the re-supplying the water, the water is supplied in the vicinity of the storage part provided at a bottom of the tub to allow the water to be supplied to the storage part without passing the laundry,*

*wherein the preset level in the re-supplying is a level that allows the heater to be submerged in the water, while not allowing the bottom of the drum to be submerged in the water, and*

*wherein the soaking the laundry further includes circulating the water heated by the heater provided in the storage part through a circulation pump along a circulation path to an injection nozzle where the heated water is injected into an upper space within the tub.*

*26. The method according to claim 25, wherein the supplying the steam includes supplying the steam until an inner temperature of the tub reaches a preset temperature.*

*27. The method according to claim 25, wherein the supplying the steam includes supplying the steam until a preset time period is expired.*

*28. The method according to claim 25, wherein the supplying the steam includes supplying the steam until the water level in the tub is lowered to a preset minimum level.*

* * * * *